United States Patent [19]

Iwata et al.

[11] 3,981,016
[45] Sept. 14, 1976

[54] ANTENNA APPARATUS FOR DETECTING AN OPTIMUM DIRECTIVITY

[75] Inventors: Hideo Iwata, Neyagawa; Hiroshi Ohyama; Atsushi Oyama, both of Hirakata, all of Japan

[73] Assignee: Matsushita Electric Industrial Co., Ltd., Osaka, Japan

[22] Filed: Jan. 7, 1975

[21] Appl. No.: 539,225

[30] Foreign Application Priority Data
Mar. 6, 1974 Japan.............................. 49-26501
Mar. 7, 1974 Japan.............................. 49-26881

[52] U.S. Cl............................................. 343/117 R
[51] Int. Cl.²........................................ G01S 3/44
[58] Field of Search................... 343/117 R, 117 A

[56] References Cited
UNITED STATES PATENTS

| | | | |
|---|---|---|---|
| 3,206,754 | 9/1965 | Morris............................. | 343/117 R |
| 3,312,973 | 4/1967 | Rogers............................ | 343/117 R |
| 3,671,969 | 6/1972 | Basman........................... | 343/117 R |

Primary Examiner—Maynard R. Wilbur
Assistant Examiner—Richard E. Berger
Attorney, Agent, or Firm—Wenderoth, Lind & Ponack

[57] ABSTRACT

An antenna apparatus for detecting an optimum directivity. The apparatus has an antenna capable of having plural directivities at predetermined directions; a scanning signal generator coupled to the antenna for generating a scanning signal for scanning the plural directivities from the first directivity to the last directivity; a signal level memory coupled to the antenna for memorizing plural memorized signals which are proportional to the output signal levels of the antenna at the plural directivities, respectively, when the plural directivities are scanned by the scanning signal; a detector coupled to the signal level memory memorized for detecting a maximum level memory signal from among the plural memorized signals after the scanning; and a controller coupled between the scanning signal generator and the detector for controlling the scanning signal generator in response to the maximum level memorized signal so as to fix the directivity of the antenna at the directivity corresponding to the maximum level memorized signal.

15 Claims, 7 Drawing Figures

ANTENNA APPARATUS FOR DETECTING AN OPTIMUM DIRECTIVITY

This invention relates to an antenna apparatus for detecting an optimum directivity.

Conventionally, several techniques exist for communicating with many stations located in many direction. A first technique is to use an omni-directional antenna apparatus. A second technique is to use a single directional antenna apparatus and mechanically rotate the antenna to seek an optimum direction (directivity). A third technique is to use a plural directional antenna apparatus set at fixed directions and manually switching the output terminals of antennas to be operated so as to find which one of the antennas should be operated. However, these techniques have drawbacks. For example in the first technique, the antenna apparatus is likely to receive signals from undesired directions (stations), and it has a low gain. In the second technique, it is very difficult to rotate the antenna at a high speed. Therefore, it takes much time to find the optimum direction. In the third technique, it is troublesome to manually switch the output terminals of the antennas.

There is also known a fourth technique in which plural antennas are provided and the output signals thereof are electrically switched sequentially in a fixed order. Once an output signal having a level above a predetermined level is detected by the switching operation, the switching operation is stopped, and the directivity of the antenna apparatus is fixed at the direction at which the switching operation is stopped. However, it is not certain from this technique whether the thus fixed direction is the optimum one or not. It is quite probable that there may be a better direction than the first established one, which better direction is one beyond the direction at which the switching operation has been stopped.

It is an object of this invention to provide an antenna apparatus by which an optimum directivity can be electrically, automatically and quickly detected.

This object is achieved according to this invention by providing an antenna apparatus comprising: an antenna means capable of having plural directivities at predetermined directions; scanning signal generating means operatively coupled to the antenna means for generating a scanning signal for scanning the plural directivities from the first directivity to the last directivity; signal level memory means operatively coupled to the antenna means for memorizing plural memorized signals which are proportional to output signal levels of the antenna means at the plural directivities, respectively, when the plural directivities are scanned by the scanning signal; detecting means operatively coupled to the signal level memory means for detecting a maximum level memorized signal from among the plural memorized signals after the scanning; and control means operatively coupled between the scanning signal generating means and the detecting means for controlling the scanning signal generating means is response to the maximum level memorized signal so as to fix the directivity of the antenna means at the directivity corresponding to the maximum level memorized signal.

This and other objects of this invention and features of this invention will be apparent upon considering the following detailed description taken together with the accompanying drawings, in which.

Figure 1:
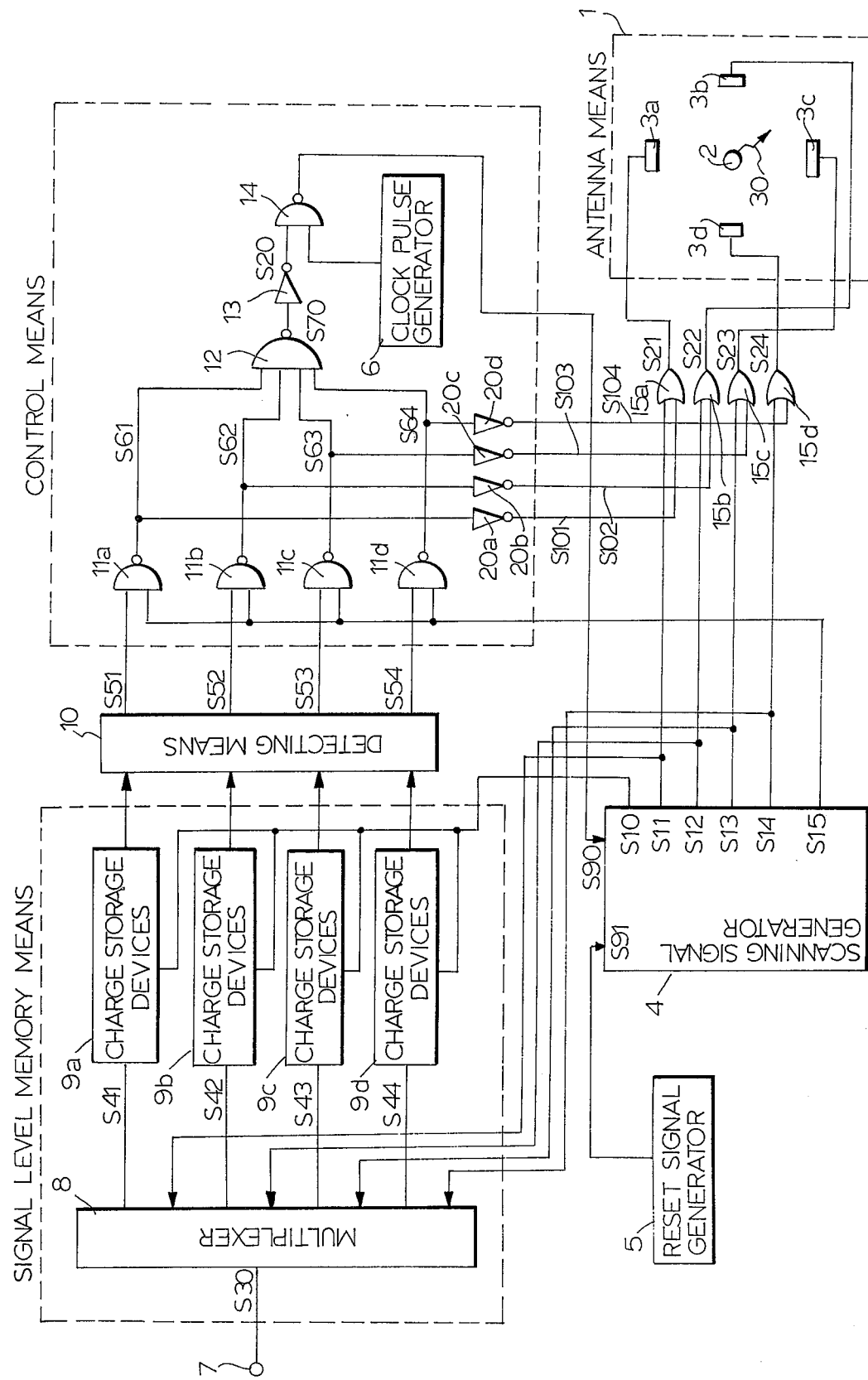
FIG. 1 is a schematic block diagram of one embodiment of the antenna apparatus according to this invention.
Figure 2:
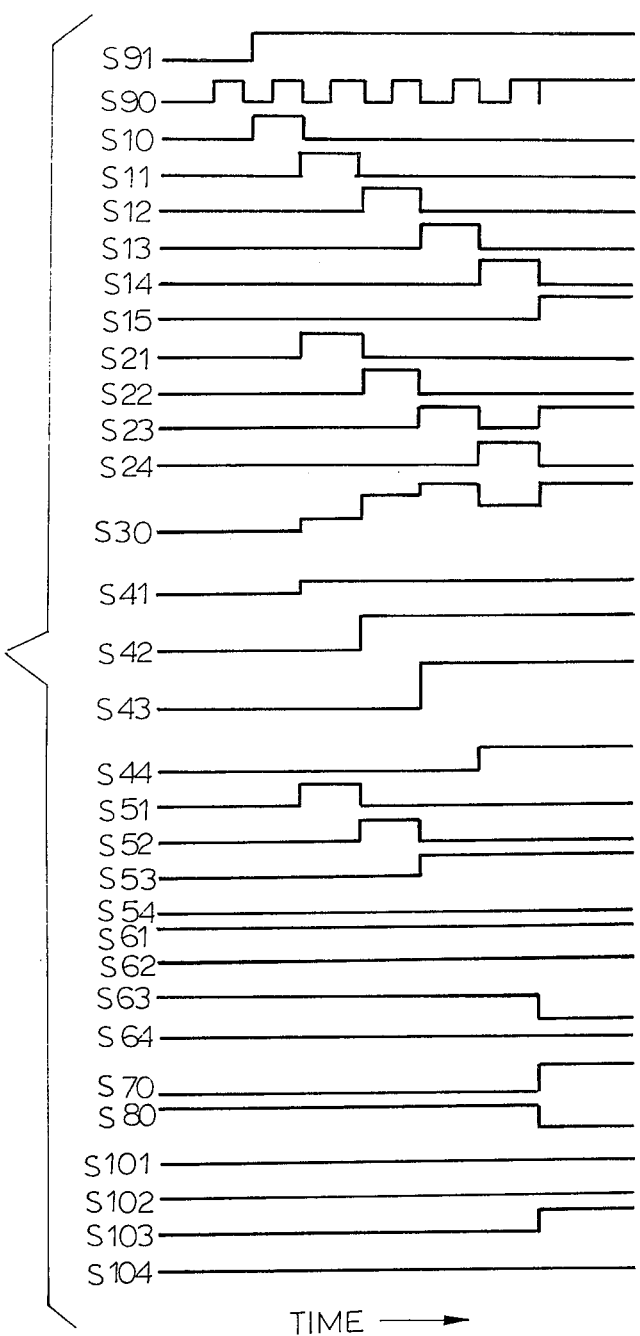
FIG. 2 is an example of a time chart showing signals appearing in the antenna apparatus of FIG. 1 at the points indicated in FIG. 1.

Referring to FIG. 1, reference numeral 1 designates one example of an antenna means which can be used in the antenna apparatus of this invention. This antenna means is capable of having plural directivities at predetermined directions. The antenna means 1 in FIG. 1 comprises an omni-directional radiator 2 and four parasitic elements 3a, 3b, 3c and 3d which are arranged around the radiator 2 in directions from the radiator 2 corresponding to the predetermined directions. FIG. 1 shows the case when the parasitic elements 3a, 3b, 3c and 3d are arranged equi-distantly from the radiator 2 and from each other. The number of the parasitic elements can be chosen optionally in accordance with the desired number of directions subjected to the directivity detecting. Any available and suitable means each of which acts as a reflector or a director depending on the signal applied thereto, can be used for the parasitic elements 3a, 3b, 3c and 3d. Thereby, the antenna means 1 can have four directivities at four directions. For example, each parasitic element can comprise an impedance circuit and a switching device. Reference numeral 4 designates scanning signal generating means operatively coupled to the antenna means 1 for generating a scanning signal for scanning the plural directivities from the first directivity to the last directivity. In FIG. 1, the scanning signal generating means 4 has two input terminals and six output terminals. The scanning signal generating means 4 generates six signals four scanning signals $S_{11}$, $S_{12}$, $S_{13}$ and $S_{14}$ from four output terminals thereof, and a clearing signal $S_{10}$ and a termination indicating signal $S_{15}$ from the other two output terminals. Signals $S_{10}$ to $S_{15}$ are time sequentially related such as shown in FIG. 2. FIG. 2 shows the case when signals $S_{10}$ to $S_{15}$ are digital signals. Any available and suitable means which can produce such time sequentially related signals can be used for the scanning signal generating means 4. For example, a ring counter can be used therefor. In FIG. 1, there are provided four scan driving gates 15a, 15b, 15c and 15d. The signals $S_{11}$ to $S_{14}$ are transferred to the scan driving gates 15a, 15b, 15c and 15d, respectively. The scan driving gates 15a, 15b, 15c and 15d are also coupled to the four parasitic elements 3a, 3b, 3c and 3d respectively. Each parasitic element is so designed that when it receives a digital "1" signal from the corresponding scan driving gate, i.e. when there is an output signal in the corresponding scan driving gate, the parasitic element acts as a director. When the parasitic element receives a digital "0" signal from the corresponding scan driving gate, i.e. when there is no output signal in the corresponding driving gate, the parasitic element acts as a reflector. Thus, the antenna means 1 has a directivity in the direction from the omni-directional radiator 2 to the parasitic element which acts as a director. Thus, the antenna means is capable of having plural (four) directivities depending on the signals applied to the parasitic elements from the scan driving gates. When signals $S_{11}$ to $S_{14}$ have a time sequence in the order such as in FIG. 2, the parasitic elements $3a$, $3b$, $3c$ and $3d$ are respectively given a first directivity, a second directivity, a third directivity and a fourth (last) directivity. The scan driving gates $15a$ to $15d$ can be any available and suitable gates. In FIG. 1, each scan driving gate has two input terminals one of which receives an output signal from a corresponding holding gate which will be described later. The other input terminal receives the above described scanning signal. The output signal $S_{10}$ is a signal for clearing possible memory signals existing in the memory means, which will be described later, before the scanning signal $S_{11}$ is generated. However, it is not necessary for the scanning signal generating means 4 to produce such signal $S_{10}$ when the memory means does not have undesired memory signals therein before the scanning operating. The output signal $S_{15}$ is a termination indicating signal for indicating the termination of one full scanning operation and is applied to holding gates which will be described later. The signal designated by $S_{90}$ is an input signal to the scanning signal generating means 4 which is an output signal from the clock pulse gate 14 which will be described later and is e.g. a clock pulse such as shown in FIG. 2 to shift the digital "1" signal at the outputs of the scanning signal generating means. The signal designated by $S_{91}$ is a reset signal applied to one input of the scanning signal generating means for forcedly setting the signal $S_{10}$ digital "1", and setting the other output signals $S_{11}$ to $S_{15}$ digital "0" so as to set the operation of the scanning signal generating means at the initial state. This reset signal $S_{91}$ is produced by a reset signal generating means 5. This reset signal generating means 5, however, is not an essential component in the antenna apparatus of this invention. But the reset signal generating means 5 can advantageously be used for resetting the operation of the scanning signal generating means 4 e.g. at the start of the operation of the antenna apparatus, when it is required to reset the scanning signal generating means for again detecting an optimum directivity of the antenna means. The reset signal generating means 5 can be optionally designed so as to be operated manually or automatically.

Reference numeral 7 designates an input terminal of the antenna apparatus which receives d.c. output signals (e.g. AGC signal or the output of a signal strength indicating meter when such is used) from a radio receiver (not shown) the antenna terminal of which is connected to an output terminal 30 of the antenna means 1. Reference numeral 8 designates a multiplexer comprising four control terminals coupled, respectively, to the four output terminals of the scanning signal generating means 4 and also comprising four output terminals. The multiplexer 8 receives from the input terminal 7 four d.c. signals from the radio receiver corresponding to four output signal levels of the antenna means 1 at the four directions. The four d.c. signals from the radio receiver are time sequentially arranged such as shown by $S_{30}$ in FIG. 2 due to the scanning operation by the scanning signals from the scanning signal generating means 4. The signal $S_{30}$ in FIG. 2 shows the case when the output signal level of the antenna means 1 produced by means of the parasitic element $3c$ is higher than any of the other three output signal levels. The multiplexer 8 divides the four d.c. signals with the aid of the four scanning signals from the scanning signal generating means 4 into four d.c. output signals $S_{41}$, $S_{42}$, $S_{43}$ and $S_{44}$ such as shown in FIG. 2 appearing, respectively, at the four output terminals thereof. Reference numerals $9a$, $9b$, $9c$ and $9d$ designate charge storage devices coupled to the output terminals of the multiplexer 8 for storing the four d.c. signals $S_{41}$, $S_{42}$, $S_{43}$ and $S_{44}$ from the multiplexer 8. The function of the multiplexer 8, in other words, is to sequentially transfer the d.c. signals in the output of the radio receiver to the charge storage devices, respectively, under the control of the scanning signal generating means 4. The signals thus stored in the charge storage devices can be called memorized signals. The charge storage devices store the memorized signals for a sufficient time for at least one full scannint to be finished. Thus, the combination of the multiplexer 8 and the charge storage device $9a$, $9b$, $9c$ and $9d$ act as a signal level memory means coupled to the antenna means for memorizing four memory signals which are proportional to the output signal levels of the antenna means at four directivities, respectively, when the four directivities are scanned by the scanning signals. It is to be noted that any other scanning level memory means having such a function can also be used instead of the combination of the multiplexer 8 and the charge storage devices $9a$, $9b$, $9c$ and $9d$.

Reference numeral 10 designates detecting means coupled to the signal level memory means for detecting the maximum level memorized signal from among the four memory signals after one full scanning. Any available and suitable means having such a function can be used therefor. For example, a 4-input 4-output voltage comparator can be used therefor. The detecting means compares all the memorized signals applied thereto and produces a digital "1" signal, e.g. signal $S_{53}$ such as shown in FIG. 2, for the memorized signal having the highest level and also produces digital "0" signals for the other memorized signals, e.g. signals $S_{51}$, $S_{52}$ and $S_{54}$ as shown in FIG. 2.

Reference numerals $11a$, $11b$, $11c$ and $11d$ designate holding gates operatively coupled to the four outputs of the detecting means 10 and also coupled to one output terminal of the scanning signal generating means 4 for receiving therefrom the termination indicating signal $S_{15}$. The holding gates $11a$, $11b$, $11c$ and $11d$ hold the digital signals from the detecting means 10 until the holding gates receive the termination indicating signal $S_{15}$, and also pass therethrough the four digital signals from the detecting means when the holding gates receive the termination indicating signal $S_{15}$. The holding gates $11a$, $11b$, $11c$ and $11d$ are also coupled, at the outputs thereof, to the scan driving gates $15a$, $15b$, $15c$ and $15d$, respectively, for setting the directivity of the antenna means 1 at the optimum directivity in response to the digital signals from the holding gates, whereby the parasitic element such as $3c$ which corresponds to the memorized signal having the highest signal level is set as a director and the other parasitic elements are set as reflectors. The output signals of the holding gates are, for example, signals $S_{61}$, $S_{62}$, $S_{63}$ and $S_{64}$ as shown in FIG. 2. In FIG. 1, there are provided inverters 20a, 20b, 20c and 20d coupled between the holding gates and the scan driving gates for adjusting the polarity of the signals between these gates. However, these inverters are not essential elements and can be removed depending on the kinds of the arrangements of those gates. The output signals of the scan driving gates thus treated are, for example, signals $S_{21}$, $S_{22}$, $S_{23}$ and $S_{24}$ in FIG. 2, and the output signals of the inverters 20a, 20b, 20c and 20d are, for example, signals $S_{101}$, $S_{102}$, $S_{103}$ and $S_{104}$ as shown in FIG. 2.

Reference numeral 12 designates a 4-input one-output maximum signal detecting gate coupled, at the four inputs thereof, to the four output terminals of the holding gates, respectively. The maximum signal detecting gate is coupled at the output thereof to a clock pulse gate 14 which receives a clock pulse from a clock pulse generator 6. In the case when at least one of the output signal levels of the antenna means is above a predetermined level i.e. when there is at least one maximum d.c. memorized signal at the outputs of the signal level memory means 9a, 9b, 9c and 9d, the maximum signal detecting gate 12 produces, at the output thereof, a digital signal for preventing the clock pulse from being transferred through the clock pulse gate 14. Therefore, the scanning signal generating means 4 stops its scanning operation, and the directivity as set in the manner described above is fixed as the optimum directivity. In the case when all of the output signal levels of the antenna means 1 are below the predetermined level, i.e. when there is no maximum d.c. memorized signal at the outputs of the signal level memory means 9a, 9b, 9c and 9d, the maximum signal detecting gate 12 does not produce, at the output thereof, a digital signal for preventing the clock pulse from being transferred through the clock pulse gate 14. In this case, the directivity of the antenna means is not set by the signals from the holding gates, and the clock pulse is allowed to pass through the clock pulse gate, and the directivity of the antenna means is not fixed. Therefore, the scanning operation is again performed. Thus, the scanning operation does not stop until there appears a case when at least one of the output signal levels of the antenna means is above the predetermined level. In FIG. 1, there is provided an inverter 13 coupled between the maximum signal detecting gate 12 and the clock pulse gate 14 for adjusting the polarity of the signal between these gates. However, this inverter 13 is not an essential element and can be removed depending on the kinds of arrangements of these gates 12 and 14. The output signals of the gate 12 and the inverter 13 are, for example, signals $S_{70}$ and $S_{80}$ as shown in FIG. 2. As is apparent from the foregoing, the combination of the elements 11a, 11b, 11c, 11d, 20a, 20b, 20c, 20d, 12, 13, 14 and 6 can be called control means operatively coupled to the scanning signal generating means 4 and the detecting means 10 for controlling the scanning signal generating means 4 in response to the maximum level memorized signal so as to fix the directivity of the antenna means at the directivity corresponding to the maximum level memorized d.c. signal. Any other suitable combination for the control means can be used instead of the control means as shown in FIG. 1 if it has a function such as described above.

Summarizing the embodiment as shown in FIG. 1, one example of the antenna apparatus according to this invention comprises: an antenna 1 having $n$ control terminals and capable of having plural directivities at $n$ predetermined directions, $n$ being an integer not less than 2; a clock pulse generator 6 for generating a clock pulse; a clock pulse gate 14 coupled to the clock pulse generator; a ring counter 4 coupled to the clock pulse gate and comprising $n+1$ output terminals; $n$ scan driving gates 15 coupled to the $n$ output terminals, respectively, of the ring counter and also coupled to the $n$ control terminals, respectively, of the antenna means, the $n$ directivities of the antenna means being scanned by $n$ output signals from the $n$ output terminals of the ring counter, the output signal from the other one of the $n+1$ output terminals of the ring counter being a termination indicating signal for indicating the termination of one full scanning; a multiplexer 8 comprising $n$ control terminals coupled, respectively, to the $n$ output terminals of the ring counter and also comprising $n$ output terminals, the multiplexer receiving $n$ d.c. signals from a radio receiver corresponding to $n$ output signal levels of the antenna means at the $n$ predetermined directions, respectively; $n$ charge storage devices 9 coupled to the $n$ output terminals of the multiplexer, the multiplexer sequentially transferring the $n$ d.c. signals to the $n$ charge storage devices, respectively, under the control of the $n$ output signals of the ring counter, the $n$ charge storage devices being charged by the transferred $n$ d.c. signals, respectively; and $n$-input $n$-output voltage comparator 10 coupled to the $n$ charge storage devices for detecting a maximum d.c. signal from among the $n$ d.c. signals stored in the $n$ charge storage devices when at least one of the $n$ output signal levels of the antenna means is above a predetermined level, and the voltage comparator producing $n$ digital signals corresponding to the $n$ d.c. signals, the digital signal corresponding to the maximum d.c. signal being different from the other digital signals; $n$ holding gates 1 coupled to the $n$ outputs of the voltage comparator, respectively, and also coupled to one output terminal of the ring counter for receiving the termination indicating signal, the $n$ holding gates holding the $n$ digital signals from the voltage comparator until receiving the termination indicating signal and also passing therethrough the $n$ digital signals from the voltage comparator upon receiving the termination indicating signal, the $n$ holding gates being coupled at $n$ output terminals thereof to the $n$ scan driving gates, respectively; and an $n$-input one output maximum signal detecting gate 14 coupled to the $n$ output terminals of the $n$ holding gates, respectively, at the $n$ inputs thereof and also coupled to the clock pulse gate for (1) preventing said clock pulse from being transferred through the clock pulse gate in the case when at least one of the $n$ output signal levels of the antenna means is above the predetermined level, and (2) allowing the clock pulse to pass through the clock pulse gate in the case when all of the $n$ output signal levels of the antenna means are below the predetermined level, and the $n$ holding gates being coupled at $n$ outputs thereof to the $n$ scan driving gates at the inputs of the $n$ scan driving gates, whereby when at least one of the $n$ output signal levels of the antenna means is above the predetermined level, the directivity of the antenna means is fixed at the directivity corresponding to the maximum d.c. signal.

Specific examples of elements which can be used for the elements as shown in and described with reference to FIG. 1 will be described below with reference to FIG. 3.

Figure 3:
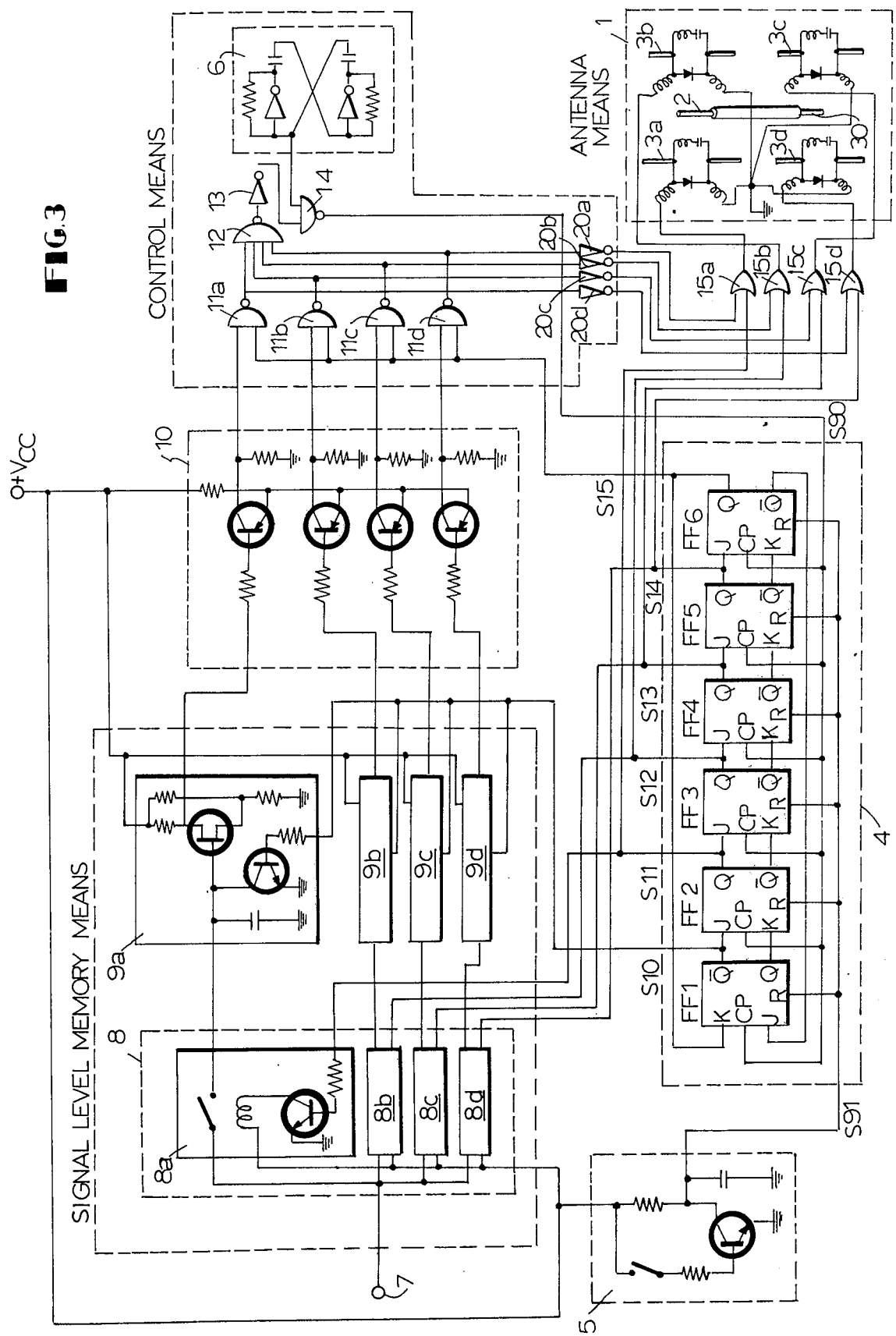
FIG. 3 is a schematic circuit diagram showing one exemplary circuit corresponding to the block diagram of FIG. 1.

Referring to FIG. 3, a sleeve antenna 2 is used for the omni-directional antenna. As for each of parasitic elements 3a, 3b, 3c and 3d, a switching diode, as a switching device, and inductors and a capacitor, as an impedance circuit are used as shown. The switching diode, inductors and the capacitor in each parasitic element are designed so that when the switching diode is in the ON-state, the parasitic element acts as a director, and when the switching diode is in the OFF-state, the parasitic element acts as a reflector. The ring counter 4 is composed of six flip-flops F.F. 1 to F.F. 6 as shown. The ring counter is reset by the reset signal $S_{91}$ and is actuated by the clock pulse $S_{90}$ so as to produce digital "1" signal which is circularly shifted from the output of F.F. 1 to the output of F.F. 6. The reset signal (pulse) generating means 5 is composed of a transistor, resistors, a capacitor and a manually operable switch as shown. The clock pulse generator 6 is an unstable multi-vibrator composed of two NOT gates, two resistors and two capacitors as shown. The multiplexer 8 is composed of four switching circuits 8a, 8b, 8c and 8d which have a common input terminal and each of which is composed of a lead-relay and a transistor driver as shown. Each of the charge storage devices 9a, 9b, 9c and 9d, as shown, is composed of a field effect transistor, a capacitor connected to the input terminal of the field effect transistor and a transistor connected to the input terminal of the field effect transistor for clearing the signal charged (memorized) in the capacitor before the before-mentioned scanning operation. The voltage comparator 10 is a differential amplifier composed of four transistors which has a common emitter terminal and each of which receives an input signal from the base thereof and produces an output signal from the collector thereof as shown. +Vcc represents a power source. Four two-input NAND gates are used for the holding gates 11a, 11b, 11c and 11d as shown. A four-input NAND is used for the maximum signal detecting gate 12 as shown. A NOT gate is used for the inverter 13 as shown. A two-input NAND gate is used for the clock pulse gate 14 as shown. A two-input OR gate is used for each of the four scan driving gates 15a, 15b, 15c and 15d as shown. Four NOT gates are used for the inverters 20a, 20b, 20c and 20d as shown.

Figure 4:
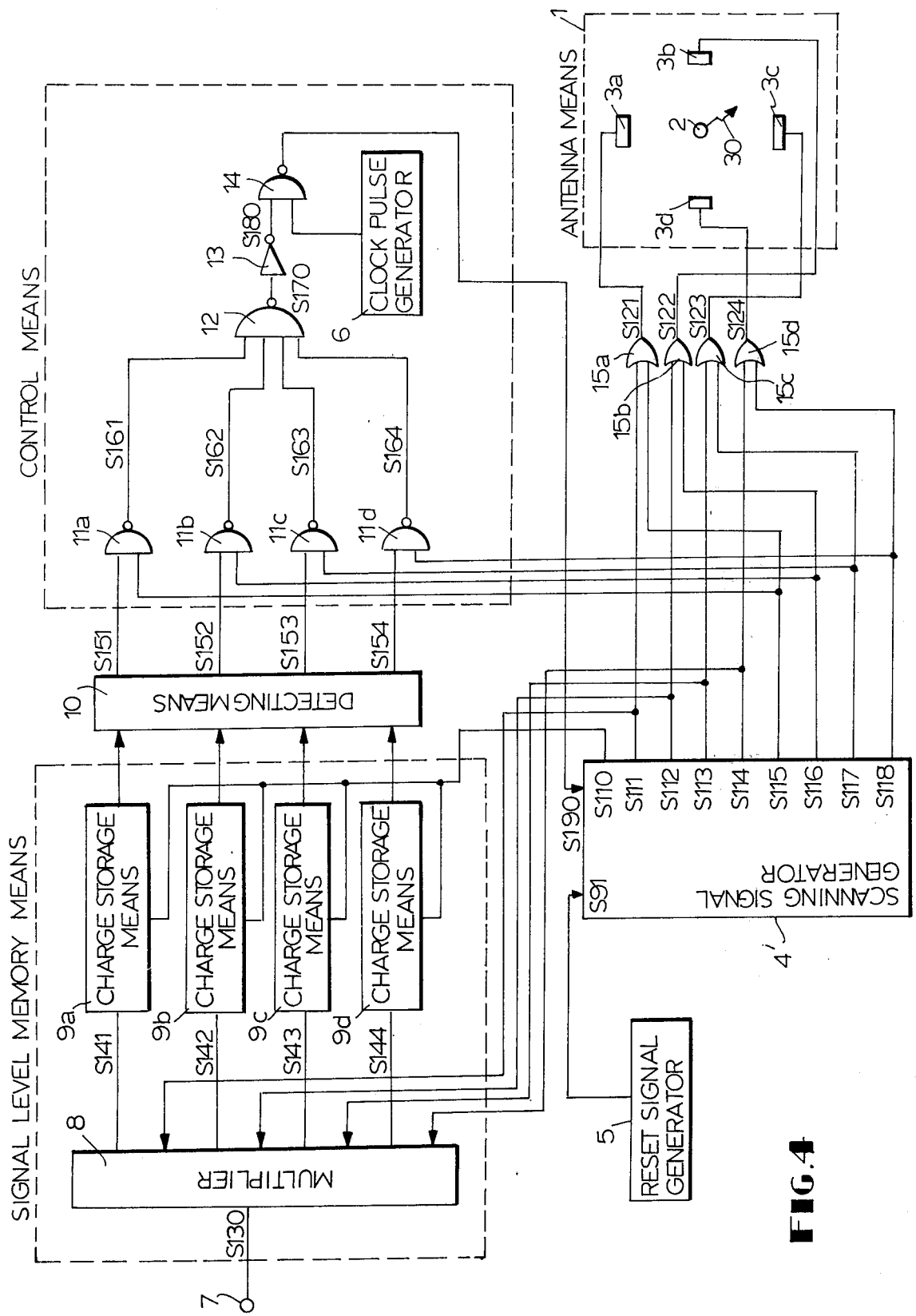
FIG. 4 is a schematic block diagram of another embodiment of the antenna apparatus according to this invention.
Figure 5:
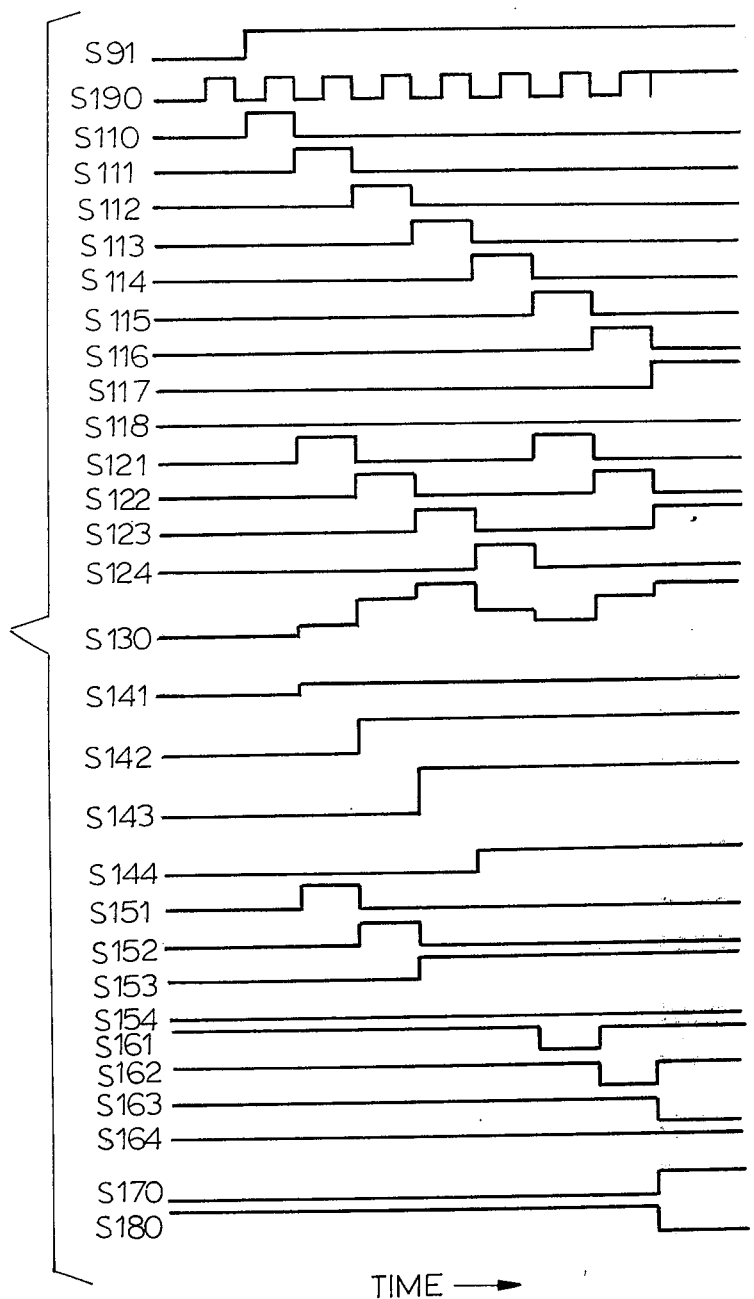
FIG. 5 is an example of a time chart showing signals appearing in the antenna apparatus of FIG. 4 at the points indicated in FIG. 4.

FIG. 4 shows another embodiment of the antenna apparatus according to this invention. The embodiment represented in FIG. 4 is substantially the same as that of FIG. 1. Similar elements in FIGS. 1 and 4 are designated by similar reference numerals. The basic differences between FIGS. 1 and 4 are that: the scanning signal generating means 4' in FIG. 4 generates four scanning signals $S_{115}$, $S_{116}$, $S_{117}$ and $S_{118}$ instead of the terminal indicating signal $S_{15}$ in FIG. 1; the four scanning signals $S_{115}$, $S_{116}$, $S_{117}$ and $S_{118}$ are applied, respectively, to the inputs of the holding gates 11a, 11b, 11c and 11d and also to the inputs of the scan driving gates 15a, 15b, 15c and 15d in FIG. 4 as shown; and the outputs of the holding gates 11a, 11b, 11c and 11d which in FIG. 1 are coupled to the inputs of the scan driving gates 15a, 15b, 15c and 15d are not coupled thereto in FIG. 4. The four scanning signals $S_{115}$, $S_{116}$, $S_{117}$ and $S_{118}$ are as shown in FIG. 5. The scanning signals $S_{110}$ to $S_{114}$ and $S_{115}$ to $S_{118}$ are time sequentially related signals as shown in FIG. 5. After one full scanning operation by signals $S_{111}$ to $S_{114}$, one digital signal corresponding to a maximum level d.c. memorized signal appears at one of the outputs of the voltage comparator 10 in a manner the same as that already described with reference to FIGS. 1 and 3, and is held in one of the holding gates corresponding thereto. The other digital signals corresponding to the other d.c. memorized signals appear at the other outputs of the voltage comparator 10 and are held in the other holding gates. When the holding gate 11a holding a digital signal receives a scanning signal $S_{115}$ from the corresponding output terminal of the scanning signal generating means 4', a digital "1" signal is produced at the output of the holding gate 11a if the digital signal held in the holding gate 11a corresponds to the maximum d.c. memorized signal. Assuming that only the digital signal held in the holding gate 11c corresponds to the maximum d.c. memory signal, a digital "0" signal is produced at the output of the holding gate 11a, and thus the maximum signal detecting gate 12 is not actuated by the output of the holding gate 11a so as not to actuate the clock pulse gate 14 to prevent the clock pulse from passing therethrough. Therefore, a scanning signal $S_{116}$ is generated and transferred to the holding gate 11b. The holding gate 11b does not produce a digital "1" signal just as the holding gate 11a does not. Thus, a scanning signal $S_{117}$ is generated and transferred to the holding gate 11c. Because the holding gate 11c is holding a digital signal corresponding to the maximum d.c. memorized signal, the holding gate 11c generates, upon receiving the signal $S_{117}$, a digital "1" signal. This digital "1" signal actuates the maximum signal detecting gate 12 so as to close the clock pulse gate 14. Thus, the clock pulse from the clock pulse generator 6 is prevented from passing through the clock pulse gate 14 to the scanning signal generating means 4'. Thus, the scanning signal generator 4' stops its scanning signal generator. Meanwhile, the scanning signals $S_{115}$ to $S_{117}$ drive the scan drive gates 15a, 15b and 15c, respectively, and thus the directivities of the antenna means 1 are scanned correspondingly. Therefore, when the scanning signal generator 4' stops its scanning signal generation in a manner as described above, the directivity of the antenna means is fixed at the directivity corresponding the the maximum d.c. memorized signal, i.e. at an optimum directivity. Summarizing these operations, the directivity of the antenna means is fixed at the directivity corresponding to the maximum level memory signal in a manner such that after the maximum level of the memorized signal is detected by the detecting means 10, the directivities of the antenna means are scanned by the scanning signal from the first directivity up to the directivity corresponding to the maximum level memorized signal.

Summarizing the embodiment as shown in FIG. 4, one example of the antenna apparatus according to this invention comprises: an antenna means 1 having n control terminals and capable of having plural directivities at n predetermined directions, n being an integer not less than 2; a clock pulse generator 6 for generating a clock pulse; a clock pulse gate 14 coupled to the clock pulse generator; a ring counter 4' coupled to the clock pulse gate and comprising 2n output terminals; n scan driving gates 15 coupled to the first n output terminals, respectively, out of the 2n output terminals of the ring counter and also coupled to the n control terminals, respectively, of the antenna means, the n directivities of the antenna means being scanned by the first n output signals from the first n output terminals of the ring counter, the remaining n output terminals of the 2n output terminals of the ring counter being the second n output terminals thereof; a multiplexer 8 comprising n control terminals coupled, respectively, to the first n output terminals of the ring counter and also comprising $n$ output terminals, the multiplexer receiving $n$ d.c. signals from a radio receiver corresponding to $n$ output signal levels of the antenna means at the $n$ predetermined directions, respectively; $n$ charge storage device 9 coupled to the $n$ output terminals of the multiplexer, the multiplexer sequentially transferring the $n$ d.c. signals to the $n$ charge storage devices, respectively, under the control of the first $n$ output signals of the ring counter, the $n$ charge storage devices storing transferred $n$ d.c. signals, respectively; an $n$-input $n$-output voltage comparator 10 coupled to the $n$ charge storage devices for detecting a maximum d.c. signal from among the $n$ d.c. signals stored in said $n$ charge storage device when at least one of the $n$ output signal levels of said antenna means is above a predetermined level, and the voltage comparator producing $n$ digital signals corresponding to the $n$ d.c. signals, the digital signal corresponding to the maximum d.c. signal being different form the other digital signals; $n$ holding gates 11 coupled to the $n$ outputs of the voltage comparator, respectively, and also coupled to the second $n$ output terminals of the ring counter, the $n$ holding gates holding the $n$ digital signals from the voltage comparator until receiving at least one of the output signals from the second $n$ output terminals of the ring counter, and the $n$ holding gates having $n$ output terminals, respectively; and an $n$-input one output maximum signal detecting gate 12 coupled to the $n$ output terminals of the $n$ holding gates, respectively, at the $n$ input thereof and also coupled to the clock pulse gate at the output thereof, that the $n$ holding gates holding the $n$ digital signals from the voltage comparator until one of the $n$ holding gates which holds a digital signal corresponding to the maximum d.c. signal receives an output signal from an output terminal from among the second $n$ output terminals of the ring counter, the one of the $n$ holding gates passing therethrough the digital signal held therein upon receiving the output signal from the output terminal of the ring counter connected thereto, the thus passed digital signal preventing the clock pulse from being transferred through the clock pulse gate in the case when at least one of the $n$ output signal levels of the antenna means is above the predetermined level, the clock pulse being allowed to pass through the clock pulse gate in the case when all of the $n$ output signal levels of the antenna means are below the predetermined level, whereby when at least one of the $n$ output signal levels of the antenna means is above the predetermined level, the directivity of the antenna means is fixed at the directivity corresponding to the maximum d.c. signal passed through the one of the $n$ holding gates.

Figure 6:
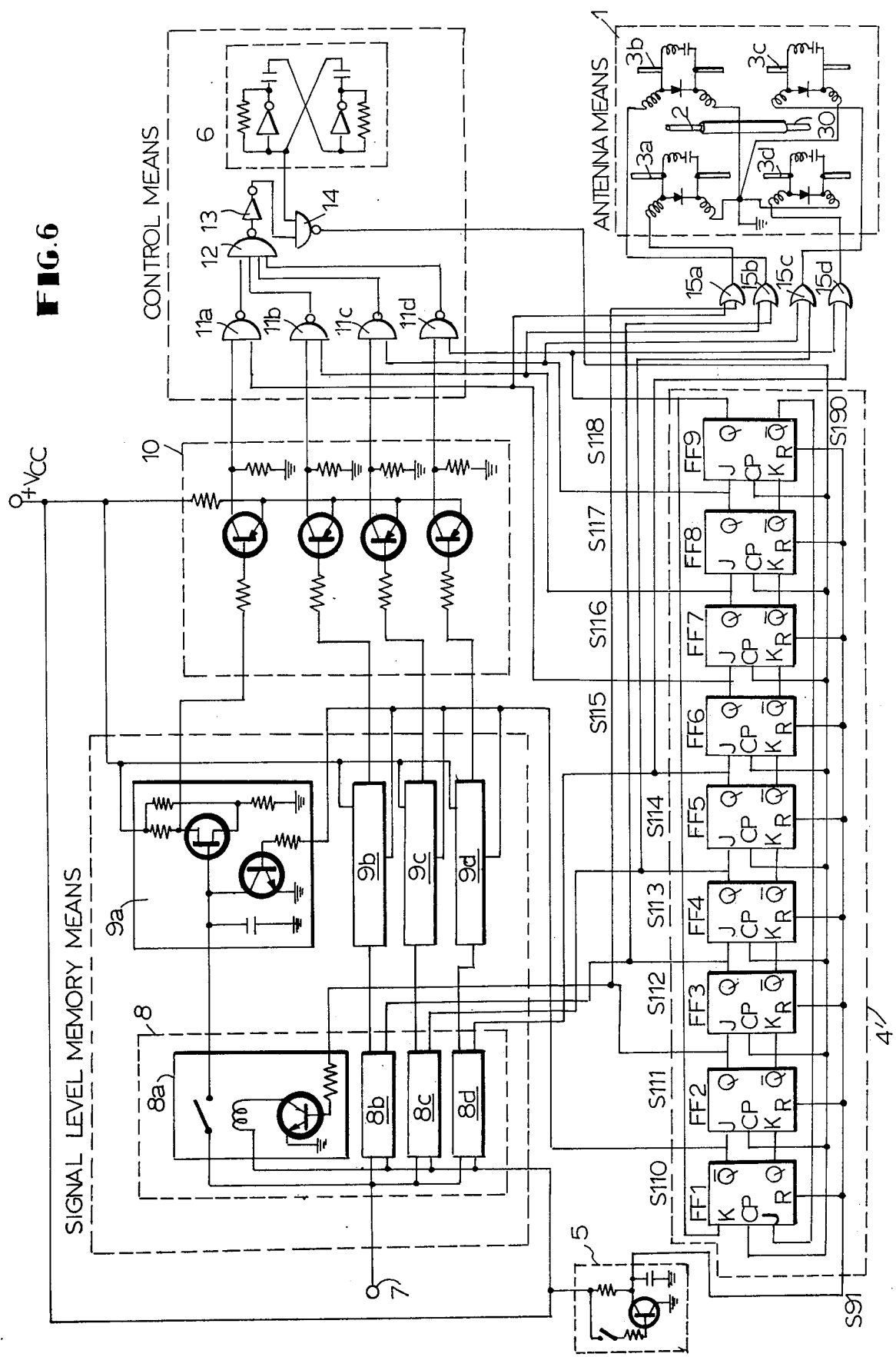
FIG. 6 is a schematic circuit diagram showing one exemplary circuit corresponding to the block diagram of FIG. 4.

The exemplary signals appearing at the outputs of the elements in FIG. 4 are shown in FIG. 5. Specific examples of elements which can be used for the elements as shown in and described with reference to FIG. 4 will be described below with reference to FIG. 6. The elements shown in FIG. 6 are substantially the same as those shown in FIG. 3. Similar elements in FIGS. 3 and 6 are designated by similar reference numerals. The basic differences between FIGS. 3 and 6 are apparent from a comparison therebetween. That is, in FIG. 6, the scanning signal generating means (ring counter) 4' is composed of nine flip-flops. The electrical connections of these flip-flops and other elements of FIG. 6 are apparent from FIG. 6 itself and the explanations of FIGS. 3 and 4.

Figure 7:
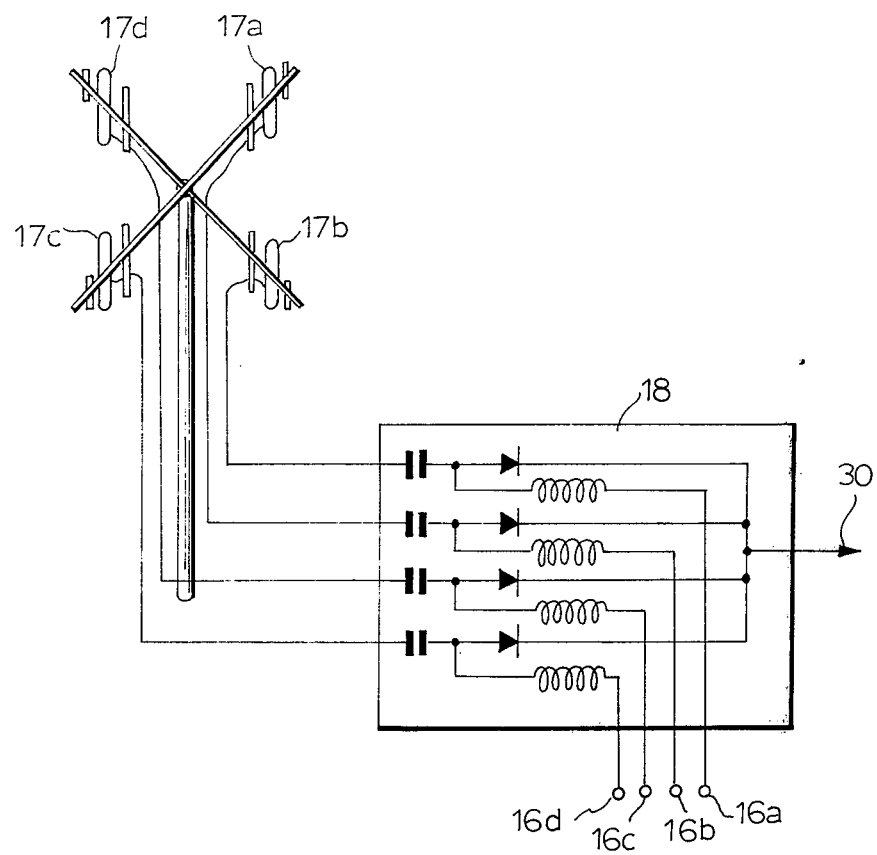
FIG. 7 is a schematic drawing showing another example of antenna means which can be used in this invention instead of that shown in FIG. 1 or 4.

FIG. 7 shows another example of antenna means which can be used in this invention instead of that shown in FIG. 1 or 4.

Referring to FIG. 7, reference numerals 17a to 17d designate directional antennas arranged in the four predetermined directions. For example, Yagi-Uda antennas can be used therefor. Reference numeral 18 designates a radio frequency switching circuit having four inputs, one output and four control terminals 16a, 16b, 16c and 16d. The four inputs thereof are coupled to the output terminals of the four directional antennas, respectively. The four control terminals thereof are coupled to the output terminals of the scan driving gates 15a, 15b, 15c, and 15d, respectively, of FIG. 1, 3, 4 or 6. The switching circuit 18 is so designed that the directional antennas 17a to 17d are successively switched on one after the other in response to the scanning signals. The switching circuit 18 can be composed of four switching diodes, five capacitors and five inductors as radio frequency chokes as shown. Summarizing the antenna means of FIG. 7, it comprises four directional antennas arranged in the four predetermined directions and a radio frequency switching circuit coupled between the four directional antennas and the scanning signal generating means, wherein the directional antennas are successively switched on one after the other in response to the scanning signals.

According to the descriptions hereinbefore, the number of the directivities to be detected is taken as four, i.e. $n=4$. However, this number can be easily changed by simple modifications from the examples described above, as will be readily understood by those skilled in the art.

In view of the foregoing description, it is evident that the antenna apparatus of this invention can automatically fix the directivity at an optimum directivity by scanning plural directivities and the scanning speed can be high. Thus, the antenna apparatus of this invention can advantageously be used not only as an antenna apparatus used at a fixed station but also as an antenna apparatus used in a moving vehicle. It has become easy according to this invention to reduce radio interference and ghost and to increase gain.

What is claimed is:

1. An antenna apparatus for detecting an optimum directivity, comprising: an antenna means capable of having plural directivities at predetermined directions, said antenna means having an omni-directional radiator and a plurality of parasitic elements arranged around said radiator in directions from said radiator corresponding to said predetermined directions and each of which acts as a reflector or a director depending on whether or not a scanning signal is applied thereto; scanning signal generating means operatively coupled to said antenna means for generating a scanning signal for scanning said parasitic elements from the first to the last; signal level memory means for memorizing plural memorized signals proportional to output signal levels of said antenna means at said plural directivities, respectively, when said plural parasitic elements are scanned by said scanning signal; detecting means operatively coupled to said signal level memory means for detecting a maximum level memorized signal from among said plural memory signals after said scanning; and control means operatively coupled between said scanning signal generating means and said detecting means for controlling said scanning signal generating means in response to said maximum level memorized signal so as to fix the directivity of said antenna means at the directivity corresponding to said maximum level memorized signal.

2. An antenna apparatus according to claim 1, wherein said scanning signal generating means comprises means for scanning the parasitic elements of said antenna means by scanning signals from the first parasitic element up to the parasitic element corresponding to said maximum level memorized signal after said maximum level memorized signal is detected by said detecting means for fixing the directivity of said antenna means at the directivity corresponding to said maximum level memorized signal.

3. An antenna apparatus according to claim 1, wherein said detecting means comprises a voltage comparator composed of a differential amplifier.

4. An antenna apparatus according to claim 1, wherein said control means comprises a clock pulse generator and a gate circuit.

5. An antenna apparatus according to claim 1, wherein said scanning signal generating means is coupled through a radio receiver to said antenna means.

6. An antenna apparatus according to claim 1, wherein said signal level memory means comprises a multiplexer and chargers, said multiplexer having the output terminals thereof coupled to said chargers, said chargers having the output terminals thereof coupled to said detecting means, and said scanning signal generating means comprises a ring counter having the output terminals thereof coupled to said plurality of parasitic elements and also to said multiplexer.

7. An antenna apparatus for detecting an optimum directivity, comprising: an antenna means capable of having plural directivities at predetermined directions, said antenna means having a plurality of directional antennas arranged in said predetermined directions and a radio frequency switching circuit coupled to said plural directional antennas, said directional antennas being successively switched on one after the other in response to scanning signals; scanning signal generating means operatively coupled to said directional antennas for generating a scanning signal for scanning said directional antennas from the first to the last; signal level memory means for memorizing plural memorized signals proportional to output signal levels of said antenna means at said plural directivities, respectively, when said plural directional antennas are scanned by said scanning signal; detecting means operatively coupled to said signal level memory means for detecting a maximum level memorized signal from among said plural memory signals after said scanning; and control means operatively coupled between said scanning signal generating means and said detecting means for controlling said scanning signal generating means in response to said maximum level memorized signal so as to fix the directivity of said antenna means at the directivity corresponding to said maximum level memorized signal.

8. An antenna apparatus according to claim 7, wherein said scanning signal generating means comprises means for scanning the directional antennas of said antenna means by scanning signals from the first directional antenna up to the directional antenna corresponding to said maximum level memorized signal after said maximum level memorized signal is detected by said detecting means for fixing the directivity of said antenna means at the directivity corresponding to said maximum level memorized signal.

9. An antenna apparatus according to claim 7, wherein said detecting means comprises a voltage comparator composed of a differential amplifier.

10. An antenna apparatus according to claim 7, wherein said control means comprises a clock pulse generator and a gate circuit.

11. An antenna apparatus according to claim 7, wherein said scanning signal generating means is coupled through a ratio receiver to said antenna means.

12. An antenna apparatus according to claim 2, wherein said signal level memory means comprises a multiplexer and chargers, said multiplexer having the output terminals thereof coupled to said chargers, said chargers having the output terminals thereof coupled to said detecting means, and said scanning signal generating means comprises a ring counter having the output terminals thereof coupled to said radio frequency switching circuit and also to said multiplexer.

13. An antenna apparatus for detecting an optimum directivity, comprising: an antenna means capable of having plural directivities at predetermined directions; scanning signal generating means operatively coupled to said antenna means for generating a scanning signal for scanning said plural directivities from the first to the last; signal level memory means for memorizing plural memorized signals proportional to output signal levels of said antenna means at said plural directivities, respectively, when said plural directivities are scanned by said scanning signal; detecting means operatively coupled to said signal level memory means for detecting a maximum level memorized signal from among said plural memory signals after said scanning; and control means operatively coupled between said scanning signal generating means and said detecting means for controlling said scanning signal generating means in response to said maximum level memorized signal so as to fix the directivity of said antenna means at the directivity corresponding to said maximum level memorized signal, wherein said signal level memory means comprises a multiplexer and chargers, said multiplexer having the output terminals thereof coupled to said chargers, said chargers having the output terminals thereof coupled to said detecting means, and said scanning signal generating means comprises a ring counter having the output terminals thereof coupled to said antenna means and also to said multiplexer, and a clock pulse generator in said control means, said ring counter being supplied with clock pulses from said clock pulse generator.

14. An antenna apparatus for detecting an optimum directivity comprising: an antenna means having $n$ control terminals and capable of having plural directivities at $n$ predetermined directions, $n$ being an integer not less than 2; a clock pulse generator for generating a clock pulse; a clock pulse gate coupled to said clock pulse generator; a ring counter coupled to said clock pulse gate and comprising $n+1$ output terminals; $n$ scan driving gates coupled to said $n$ output terminals, respectively, of said ring counter and also coupled to said $n$ control terminals, respectively, of said antenna means, said $n$ directivities of said antenna means being scanned by the $n$ output signals from said $n$ output terminals of said ring counter, the output signal from the other one of said $n+1$ output terminals of said ring counter being a termination indicating signal for indicating the termination of one full scanning; a multiplexer comprising $n$ control terminals coupled, respectively, to said $n$ output terminals of said ring counter and also comprising $n$ output terminals, said multiplexer receiving $n$ d.c. signals from a radio receiver corresponding to $n$ output signal levels of said antenna means at said $n$ predetermined directions, respectively; $n$ charge storage devices coupled to said $n$ output terminals of said multiplexer, said multiplexer sequentially transferring said $n$ d.c. signals to said $n$ charge storage devices, respectively, under the control of said $n$ output signals of said ring counter, said $n$ charge storage devices storing the transferred $n$ d.c. signals, respectively; an $n$-input $n$-output voltage comparator coupled to said $n$ charge storage devices for detecting a maximum d.c. signal from among said $n$ d.c. signals detecting a maximum d.c. signal from among said $n$ d.c. signals stored in said $n$ charge storage devices when at least one of said $n$ output signal levels of said antenna means is above a predetermined level, and said voltage comparator producing $n$ digital signals corresponding to said $n$ d.c. signals, the digital signal corresponding to said maximum d.c. signal being different from the other digital signals, $n$ holding gates coupled to said $n$ outputs of said voltage comparator, respectively, and also coupled to said second $n$ output terminals of said ring counter, said $n$ holding gates holding said $n$ digital signals from said voltage comparator until receiving at least one of output signals from said second $n$ output terminals of said ring counter, and said $n$ holding gates having $n$ output terminals, respectively; and an $n$-input one output maximum signal detecting gate coupled to said $n$ output terminals of siad $n$ holding gates, respectively, at the $n$ inputs thereof and also coupled to said clock pulse gate at the output thereof, said $n$ holding gates holding said $n$ digital signals from said voltage comparator until one of said $n$ holding gates which holds a digital signal corresponding to said maximum d.c. signal receives an output signal from an output terminal from among said second $n$ output terminals of said ring counter, said one of said $n$ holding gates passing therethrough the digital signal held therein upon receiving the output signal from the output terminal of said ring counter connected thereto, the thus passed digital signal preventing said clock pulse from being transferred through a clock pulse gate in the case when at least one of said $n$ output signal levels of said antenna means is stored in said $n$ charge storage devices when at least one of said $n$ output signal levels of said antenna means is above a predetermined level, and said voltage comparator producing $n$ digital signals corresponding to said $n$ d.c. signals, the digital signal corresponding to said maximum d.c. signal being different from the other digital signals; $n$ holding gates coupled to said $n$ outputs of said voltage comparators, respectively, and also coupled to one output terminal of said ring counter for said termination indicating signal, said $n$ holding gates holding said $n$ digital signals from said voltage comparator until receiving said termination indicating signal and also passing therethrough said $n$ digital signals from said voltage comparator upon receiving said termination indicating signal, said $n$ holding gates being coupled at $n$ output terminals thereof to said $n$ scan driving gates, respectively; and an $n$-input one output maximum signal detecting gate coupled to said $n$ output terminals of said $n$ holding gates, respectively, at the $n$ inputs thereof and also coupled to said clock pulse gate for (1) preventing said clock pulse from being transferred through said clock pulse gate in the case when at least one of said $n$ output signal levels of said antenna means is above said predetermined level, and (2) allowing said clock pulse to pass through said clock pulse gate in the case when all of said $n$ output signal levels of said antenna means are below said predetermined level, and said $n$ holding gates being coupled at $n$ outputs thereof to said $n$ scan driving gates at the inputs of said $n$ scan driving gates, whereby when at least one of said $n$ output signal levels of said antenna means is above said predetermined level, the directivity of said antenna means is fixed at the directivity corresponding to said maximum d.c. signal.

15. An antenna apparatus for detecting an optimum directivity, comprising: an antenna means having $n$ control terminals and capable of having plural directivities at $n$ predetermined directions, $n$ being an integer not less than 2; a clock pulse generator for generating a clock pulse; a clock pulse gate coupled to said clock pulse generator; a ring counter coupled to said clock pulse gate and comprising $2n$ output terminals; $n$ scan driving gates coupled to the first $n$ output terminals, respectively, from among said $2n$ output terminals of said ring counter and also coupled to said $n$ control terminals, respectively, of said antenna means, said $n$ directivities of said antenna means being scanned by the first $n$ output signals from said first $n$ output terminals of said ring counter, the remaining $n$ output terminals of said $2n$ output terminals of said ring counter being the second $n$ output terminals thereof; a multiplexer comprising $n$ control terminals coupled, respectively, to said first $n$ output terminals of said ring counter and also comprising $n$ output terminals, said multiplexer being adjusted for receiving $n$ d.c. signals from a radio receiver corresponding to $n$ output signal levels of said antenna means at said $n$ predetermined directions, respectively; $n$ charge storage devices coupled to said $n$ output terminals of said multiplexer, said multiplexer sequentially transferring said $n$ d.c. signals to said $n$ charge storage devices, respectively, under the control of said first $n$ output signals of said ring counter, said $n$ charge storage devices storing the transferred $n$ d.c. signals, respectively; an $n$-input $n$-output voltage comparator coupled to said $n$ charge storage devices for above said predetermined level, said clock pulse being allowed to pass through said clock pulse gate in the case when all of said $n$ output signal levels of said antenna means are below said predetermined level, whereby when at least one of said $n$ output signal levels of said antenna means is above said predetermined level, the directivity of said antenna means is fixed at the directivity corresponding to said maximum d.c. signal passed through said one of said $n$ holding gates.

* * * * *